(12) United States Patent
Bhagwat et al.

(10) Patent No.: US 11,880,568 B2
(45) Date of Patent: Jan. 23, 2024

(54) ON DEMAND CONFIGURATION OF FPGA INTERFACES

(71) Applicant: Seagate Technology LLC, Fremont, CA (US)

(72) Inventors: Rajesh Maruti Bhagwat, Pune (IN); Nahoosh Hemchandra Mandlik, Pune (IN); Niranjan Anant Pol, Pune (IN); Hemantkumar Vitthalrao Mane, Pune (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 72 days.

(21) Appl. No.: 17/564,052

(22) Filed: Dec. 28, 2021

(65) Prior Publication Data

US 2023/0152970 A1 May 18, 2023

(30) Foreign Application Priority Data

Nov. 17, 2021 (IN) .............................. 202121052824

(51) Int. Cl.
*G06F 3/06* (2006.01)
(52) U.S. Cl.
CPC .......... *G06F 3/0607* (2013.01); *G06F 3/0629* (2013.01); *G06F 3/0659* (2013.01); *G06F 3/0679* (2013.01)
(58) Field of Classification Search
CPC ......... G06F 2213/0026; G06F 13/4282; G06F 3/0658; G06F 13/1668; G06F 13/4022; G06F 13/4027; G06F 15/7867; G06F 15/7871; G06F 3/061; G06F 3/0659; G06F 3/0688; G06F 2009/45595; G06F 3/0604; G06F 3/0613; G06F 3/0632; G06F 3/0661; G06F 3/067; G06F 3/0679; G06F 3/0683; G06F 30/331; G06F 30/34; G06F 9/45558; G06F 12/0246; G06F 12/0817; G06F 12/0868; G06F 13/16; G06F 13/20; G06F 13/364; G06F 13/4068; G06F 13/4081;
(Continued)

(56) References Cited

U.S. PATENT DOCUMENTS 6,326,806 B1   12/2001   Fallside et al.
8,099,564 B1   1/2012    Kulkarni et al.
(Continued)

OTHER PUBLICATIONS

US 11,048,658 B2, 06/2021, Olarig et al. (withdrawn)

*Primary Examiner* — Yong J Choe
(74) *Attorney, Agent, or Firm* — HOLZER PATEL DRENNAN

(57) ABSTRACT

A dynamically reconfigurable computational storage drive (CSD) that facilitates parallel data management functionality for a plurality of associated memory devices. The CSD includes an FPGA device that is dynamically reconfigurable during operation of the CSD to provide configuration of a storage interface. Specifically, the FPGA device may be dynamically configured to provide one of a plurality of different communication protocols. A physical connector may be remapped to facilitate a communication protocol without reconnecting a memory device or CSD. The CSD may be provided as a rack-mounted device or a storage appliance for dynamic provision of data management functionality to data in a storage system comprising the CSD.

24 Claims, 10 Drawing Sheets

(58) Field of Classification Search
CPC .............. G06F 13/4221; G06F 13/4234; G06F 13/426; G06F 13/4295; G06F 16/1834; G06F 16/217; G06F 16/2453; G06F 16/24549; G06F 16/2455; G06F 16/24568; G06F 16/24569; G06F 16/254; G06F 21/76; G06F 21/79; G06F 2212/1024; G06F 2212/7203; G06F 2212/7208; G06F 2213/0008; G06F 2213/0016; G06F 2213/16; G06F 3/0611; G06F 3/0628; G06F 3/0629; G06F 3/0631; G06F 3/0655; G06F 3/0674; G06F 3/0689; G06F 9/30101; G06F 9/30145; G06F 9/4411; G06F 9/445; G06F 9/44505; G06F 9/461; G06F 9/485; G06F 9/4893; G06F 9/5016; G06F 9/5044; G06F 9/5077

See application file for complete search history.

(56) References Cited

U.S. PATENT DOCUMENTS

| | | |
|---|---|---|
| 3,185,720 A1 | 5/2012 | Ansari et al. |
| 8,189,599 B2 | 5/2012 | Sharma et al. |
| 10,067,904 B2 | 9/2018 | Beeson et al. |
| 10,069,681 B2 | 9/2018 | Izenberg et al. |
| 10,540,200 B2 | 1/2020 | Cheng et al. |
| 10,592,463 B2 | 3/2020 | Kachare et al. |
| 10,628,364 B2 | 4/2020 | Shim |
| 10,719,474 B2 | 7/2020 | Kachare et al. |
| 10,880,071 B2 | 12/2020 | Pandurangan et al. |
| 10,915,469 B2 | 2/2021 | Olarig et al. |
| 10,936,529 B2 | 3/2021 | Iyer et al. |
| 10,996,896 B2 | 5/2021 | Worley et al. |
| 11,010,350 B2 | 5/2021 | Trika et al. |
| 11,392,525 B2 | 7/2022 | Cannata et al. |
| 11,550,500 B2 | 1/2023 | Gao et al. |
| 2005/0246520 A1 | 11/2005 | Vadi et al. |
| 2014/0043059 A1* | 2/2014 | Speers ............ G01R 31/318516 326/9 |
| 2015/0149691 A1 | 5/2015 | Baxter |
| 2019/0005176 A1 | 1/2019 | Illikkal et al. |
| 2020/0145367 A1 | 5/2020 | Patel et al. |
| 2020/0183937 A1 | 6/2020 | Verma et al. |
| 2020/0257629 A1 | 8/2020 | Pinto |
| 2020/0301898 A1 | 9/2020 | Samynathan et al. |
| 2020/0310694 A1 | 10/2020 | Gao et al. |
| 2021/0042156 A1 | 2/2021 | Rahardjo et al. |
| 2021/0083876 A1 | 3/2021 | Harms |
| 2021/0150033 A1* | 5/2021 | Trivedi ................. H04L 63/065 |
| 2021/0232339 A1 | 7/2021 | Mehra |
| 2021/0306142 A1 | 9/2021 | Willis et al. |
| 2021/0357151 A1 | 11/2021 | Zafar |
| 2022/0066821 A1 | 3/2022 | Pinto et al. |
| 2022/0231698 A1 | 7/2022 | Salamat et al. |
| 2022/0308770 A1 | 9/2022 | Venkataraman et al. |
| 2022/0342601 A1 | 10/2022 | Daoud et al. |
| 2023/0024949 A1 | 1/2023 | Ammari et al. |

\* cited by examiner

Inline

ON DEMAND CONFIGURATION OF FPGA INTERFACES

BACKGROUND

Data storage systems often implement a plurality of media devices to provide a desired storage capacity for the data storage system. For example, data storage systems may be implemented in data centers or other large scale computing platforms where a large storage capacity is required. In this regard, data storage systems may include rack-based installations of storage drives in which storage drives may be engaged with a backplane provided in a rack-based mounting solution. Accordingly, standardized rack sizes, backplane connectors, and other infrastructure has been developed to support efficient and interoperable operation of storage drives in data storage systems. In other examples, a storage appliance may be deployed within a network or at a given network node to facilitate persistent storage of data.

In addition, computational storage devices have been proposed where computational resources may be provided at or near a storage drive to execute certain functionality with respect to data of a data storage system. While such computational resources have been proposed for inclusion in a storage drive, a number of limitations exist for such solutions. For example, proposed approaches to computational storage devices typically include pre-programmed and static functionality that is embedded into a drive's computational capacity. Such functions are predetermined and cannot be reconfigured once the drive is deployed into a storage system. Thus, such computational storage drives are often implemented in a very particular application in which a static, repeatable function is applied to data. Moreover, such computational storage resources may rely on static connectors and communications protocols to facilitate data communication with the storage drive. As such, computational storage drives provide little flexibility to provide dynamic and adaptable functionality with respect to the functions executed by the computational storage drive.

SUMMARY

The present disclosure relates to a storage device that includes an FPGA device comprising a programmable FPGA fabric. The storage device also includes one or more memory devices in operative communication with the FPGA device. The one or more memory devices are operative for non-volatile storage of data therein. The storage device further includes a storage resource that stores a plurality of FPGA configuration bitstreams for dynamic reconfiguration of the FPGA fabric during operation of the storage drive. Specifically, the dynamic reconfiguration of the FPGA fabric is between at least a first interface protocol for communication with a host device and a second interface protocol for communication with the host device. An interface management module of the FPGA device is operative to access the storage resource to retrieve a selected FPGA configuration bitstream from the plurality of FPGA configuration bitstreams and dynamically reconfigure the FPGA fabric during operation of the storage device using the selected FPGA configuration bitstream. The storage device also includes a physical hardware port to establish operative communication between the FPGA device and a host device. The physical hardware port is utilized for both the first interface protocol and the second interface protocol to facilitate communication with the host device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
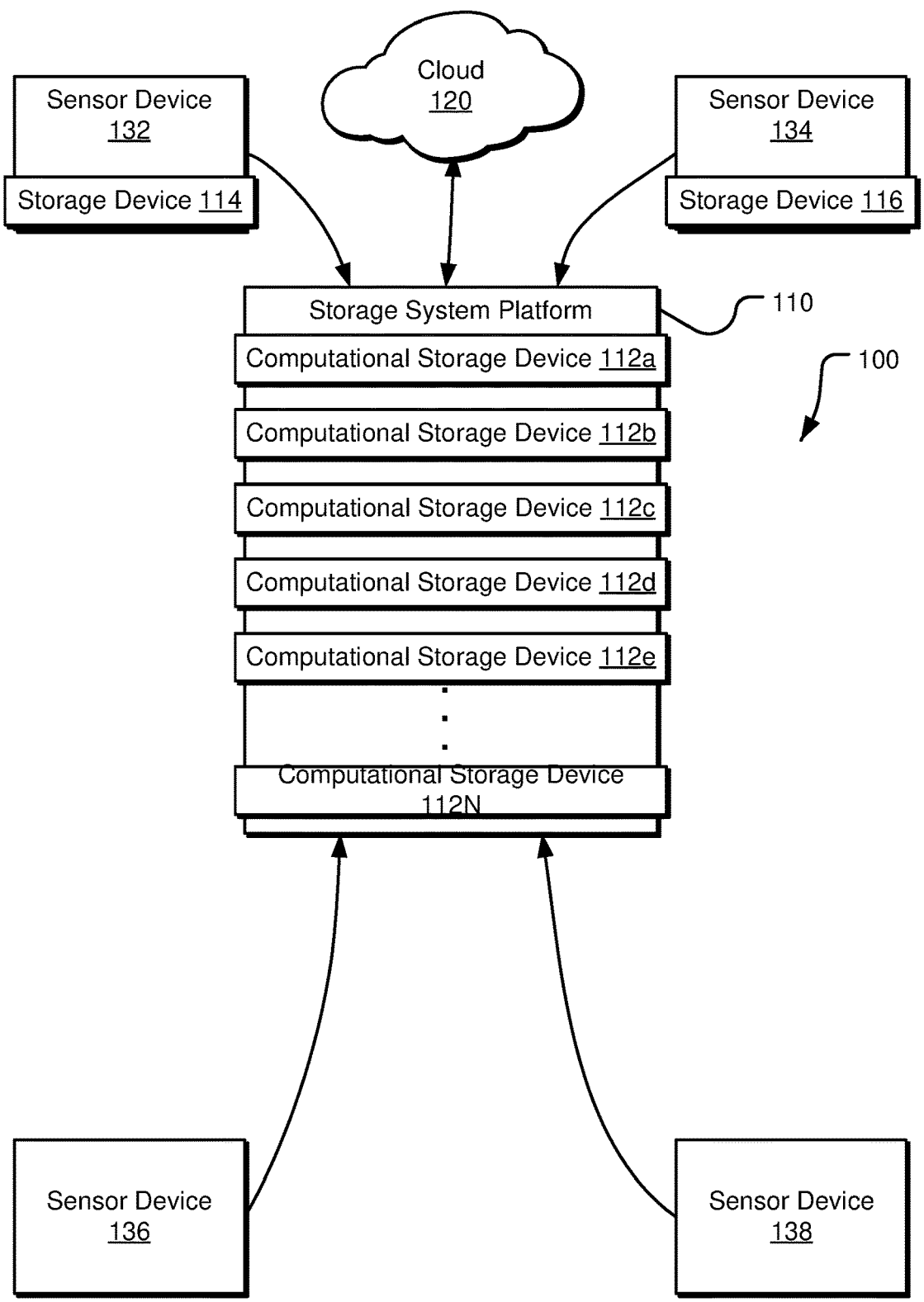
FIG. 1 is a schematic view of an example storage system.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

It has been proposed to incorporate computational resources into storage drives to facilitate some computational capacity at a storage drive to allow for some functionality to be applied to data stored locally at a storage drive with inbuilt computational resources. Such computational storage approaches have traditionally provided static, preconfigured functionality, often executed using limited computational resources. For example, such functionality was provided by means that imparted limits to the functionality that could be applied to data and could not be changed once a storage drive was deployed into a storage system. In turn, computational storage drives are often used in limited, niche roles in which the nature of the functionality applied to the data by the computational storage resources is known prior to drive provisioning and is static for the lifetime of the storage system.

The present disclosure is generally related to a storage system that includes a storage drive with one or more memory devices for persistent storage of data. Specifically, the present disclosure contemplates a dynamically configurable computational storage device (CSD) that may include or interface with a plurality of memory devices (e.g., to provide parallel data management functionality to the plurality of memory devices). The CSD may include programmable hardware that facilitates dynamic and configurable functionality that may be applied to data in a storage system. The programmable hardware of the CSD may interface with a plurality of memory devices, that may each include dedicates storage controllers. The dedicated storage controllers may allow for parallel operations to be applied relative to each of the plurality of memory devices of the CSD. In turn, the programmable hardware device may provide for parallel data management functions applied to a plurality of storage drives in communication with the programmable hardware. In still other examples, the programmable hardware device may facilitate internal or peer-to-peer data operations without intervention of a host device.

In examples described herein, the programmable hardware device may comprise a field programmable gate array (FPGA) or other programmable hardware device. In other contemplated examples, the FPGA device described herein may provide some static functionality (e.g., in the form of an application specific integrated circuit (ASIC)) while providing configurability of the communication interfaces according to the disclosure provided herein. As such, while reference is made to an FPGA or an FPGA device, it may be appreciated that other hardware devices may be provided without limitation including hardware devices that may include some static functionality and configurability of the communication interfaces. The FPGA device may include an input/output (IO) module that may facilitate operative communication between the FPGA device and a host. The FPGA device includes configurable hardware such as an FPGA fabric that may be configurable to provide hardware engines for application of one or more data management functions to data. The FPGA device may also facilitate a compute complex that enables one or more software engines for application of functionality to data. As will be described in greater detail below, the hardware and/or software engines facilitated by the FPGA device may allow for execution of data management functionality relative to data in the storage system so as to facilitate computational storage by the CSD including the FPGA device. For instance, the FPGA device described herein may facilitate dynamic configuration of an interface protocol for interfacing between a host device and the plurality of storage drives in operative communication with the FPGA device. Thus, an interface protocol may be reconfigured during operation of the CSD without having to reboot or restart the CSD and without reconfiguration of physical connections.

FIG. 1 depicts an example storage system 100. The storage system 100 includes a storage system platform 110. The storage system platform 110 may be in operative communication with a plurality of sensor devices 132-138. The sensor devices 132-138 may generate or transmit data to the storage system platform 110. The transmission of data to the storage system platform 110 may be by way of direct connection or via a network connection between the sensor devices 132-138 and the storage system platform 110. In this regard, sensor device 132, sensor device 134, sensor device 136, and sensor device 138 may each be any appropriate sensor or device to generate or relay data to the storage system platform 110. While the sensor devices 132-138 are shown in FIG. 1, this is for illustrative purposes and additional or fewer sensor devices or other sources of data may be provided without limitation.

Sensor device 132 may include a local storage device 114 for storage of data locally at the sensor device 132. Also, sensor device 134 may also include a local storage device 116. For sensor devices 132 and 134 having local storage devices 114 and 116, respectively, data may be generated by the respective sensor device and stored locally at the local storage device, offloaded to the storage system platform 110, duplicated between the local storage device and the storage system platform 110, or split between the local storage device in the storage system platform 110. In this regard, the storage device 114 and/or storage device 116 may be provided as a storage appliance deployed locally at the sensor device 132 and 132, respectively. Alternatively, sensor device 132 and/or 134 may comprise integrated storage devices and/or a CSD as described in greater detail below.

The storage system platform 110 may be in operative communication with a cloud environment 120. The cloud environment 120 may provide additional storage and/or computational resources in addition to those described below provided by the CSDs described herein. In addition, the cloud environment 120 may facilitate networked access by a host device (not shown in FIG. 1) to the storage system platform 110 for interface therewith. In other examples, a host may be directly connected to the storage system platform 110.

In traditional storage systems, data is typically transmitted to a cloud environment or to a host device, which exclusively applies functionality to the data. That is, traditionally the storage system provides persistent data storage with limited, static or no ability to provide any computational resources for data management functionality. As may be appreciated, the requirement to transmit data to a host from a storage system may involve extensive network overhead associated with the transport of data to and from such a cloud environment or host device in order to apply data management functions to the data.

As such, the storage system 100 of the present disclosure may include one or more CSDs in the storage system 100. For example, the storage system platform 110 may comprise a plurality of CSDs 112a-112N. While CSD 112a, CSD 112b, CSD 112c, CSD 112d, CSD 112e, . . . . , CSD 112N are shown in FIG. 1, it may be appreciated that additional or fewer CSDs could be provided with the storage system platform 110 without limitation. Furthermore, while not shown in FIG. 1, the storage system platform 110 may also include computational storage processors and/or other devices that may or may not include storage drives. The CSDs 112a-112N may be provided in a rack environment such that the computational storage drives 112 may be engaged with a backplane to allow for expansion, swapability, and other features common to rack-based storage drive mounting. Also, as noted above, the storage devices 114 and/or 116 disposed at edge devices, such as the sensor devices 132 and 134, may also comprise CSDs as described in greater detail below. In this regard, the CSDs described herein may comprise a storage appliance deployed at an edge node of a network. As may be appreciated in the disclosure below, a CSD may include an FPGA device that provides configurable functionality to apply data management functionality to data stored in or retrieved from the storage drives of the data storage system 100.

Figure 2:
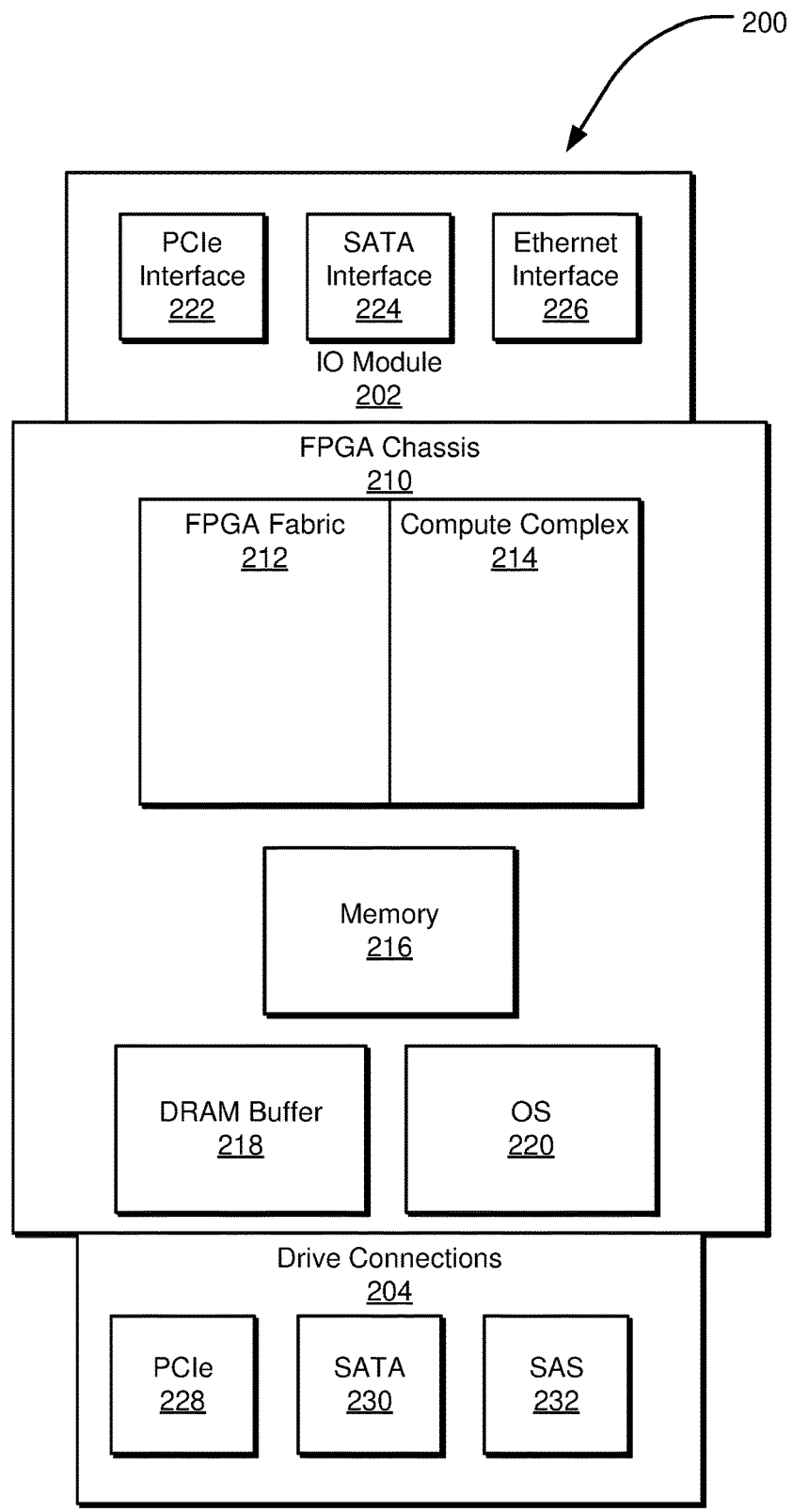
FIG. 2 is a schematic view of an example of a programmable FPGA device.

For example, FIG. 2 depicts an example FPGA device 200. The FPGA device 200 may include an 10 module 202. The 10 module 202 may include one or more standard connectors or ports for interfacing with a host device. As described in greater detail below, these connectors or ports may include, for example, ethernet ports or connectors, USB ports or connectors, SATA ports or connectors, PCIe ports or connectors, standardized backplane ports or connectors, or the like. For purposes of illustration, a PCIe interface 222, a SATA interface 224, and an ethernet interface 226 are depicted in FIG. 2. However, additional for fewer ports or connectors may be provided without limitation. Moreover, more than one of a given type of interface may also be provided without limitation.

The FPGA device 200 may also include one or more storage drive connections 204. In turn, one or more storage drives may be connected to the FPGA device 200 via the drive connections 204 to establish operative communication between the FPGA device 210 and the one or more storage drives (not shown in FIG. 2). The drive connections 204 may include a plurality of types of connectors or ports commonly utilized for different kinds of storage drives including, for example, ethernet, SATA, SAS, and PCIe ports or connectors. This may allow a wide variety of standardized storage drive form factors to be engaged with the FPGA device 200 via the drive connections 204. Accordingly, while a PCIe drive connector 228, a SATA drive connector 230, and a SAS drive connector 232 are shown in FIG. 2, other connectors or ports may be provided without limitation.

The drive connections 204 may be simultaneously support connectivity to a plurality of storage drives. Connected storage drives (illustrated as storage drive 352 and 354 in FIGS. 3-4 below) may each comprise storage controllers capable of controlling 10 operations of the storage drive. In turn, the FPGA device 200 may facilitate parallel operations of a plurality of connected storage drives. Such parallel operations may include data management functionality, read operations, write operations, erase operations, or any other operation to be performed relative to the storage drives in operative communication with the FPGA device 200. The FPGA device 200 may be configured to present the plurality of storage drives connected to the FPGA device 200 to a host as a single storage resource or a plurality of storage resources. This may allow for provisioning or tiering of the storage resources provided by the storage drives connected to the FPGA device 200. In an alternative embodiment, the FPGA device 200 may be provided as an integrated unit with the FPGA device 200 being integrated into an enclosure with one or more storage drives. In this regard, rather than having a drive connections 204 to provide swappable or interchangeable engagement between the FPGA device 200 and a storage drive, the storage drive may be fixedly connected to an FPGA device 200. In this case, the FPGA device 200 may be integrated with one or more storage drives in a common enclosed chassis.

In any regard, the FPGA device 200 and/or connected or integrated storage drives may have a form factor that is similar to or the same as a standard rack-mounted storage drive. That is, the FPGA device 200 may be provided in a common enclosure with a plurality of storage drives. Such an enclosure may comprise a standard rack-mount unit size so as to be provided in a rack-based environment such as a datacenter or the like. This may be true even when the FPGA device 200 is operatively engaged with a plurality of storage drives. As such, the FPGA device 200 and storage drives connected thereto may be deployed into a standardized rack slot for engagement with a backplane chassis of a storage system. For instance, the IO module 202 may interface with the backplane chassis of the storage system. In this regard, the FPGA device 200 may be used to provide configurable computational functionality to a storage drive in a form factor that facilitates engagement of the FPGA device 200 and associated storage drives in a standardized rack space of a storage system as a rack-mounted CSD. Alternatively, the FPGA device 200 may be provided in a common enclosure with a plurality of storage drives in the form of a storage appliance including the CSD.

The FPGA device 200 may also include computational resources capable of executing the data management functionality of a CSD. The computational resources may be provided in forms such as an FPGA fabric 212 and/or a compute complex 214. The FPGA fabric 212 may be configurable during operation of the storage system without having to reboot or power-cycle the FPGA device 200. For example, the FPGA fabric 212 may be configured based on a bitstream provided to the FPGA fabric 212. A memory 216 of the FPGA device 200 may comprise a bitstream storage area in which one or more configuration bitstreams for the FPGA fabric 212 are stored. A plurality of bitstreams may be stored in the bitstream storage area for providing different configurations to dynamically reconfigure the FPGA fabric 212. Alternatively, a portion of memory provided by a connected storage drive (not shown in FIG. 2) may include a bitstream storage area that may comprise configuration bitstreams for configuration of the FPGA fabric. In relation to the bitstreams in the bitstream storage area, the FPGA chassis 210 may include an interface to receive an updated version of a bitstream for a specific configuration or may receive new bitstreams to provide new configurations. The updated or new bitstreams can be received over a secure channel (e.g., a secured network) after confirming the authenticity of the provider of the new or updated bitstream and/or the FPGA chassis 210. Also, the FPGA chassis 210 may authenticate the signature of the new incoming bitstream. The FPGA fabric 212 may be specifically configured to facilitate one or more hardware engines for application of functionality to data stored at a locally connected storage drive, a peer storage drive in a storage system, or via the IO module 202. Such functionality may include dynamically reconfiguration a communication protocol used to communicate data to or from storage drive as described in more detail below.

The compute complex 214 may comprise one or more embedded processors such as central processing units (CPUs) and/or graphical processing units (GPUs). The compute complex 214 may include either bare metal or operating system mounted applications that may be executed by the compute complex 214. In this regard, the compute complex 214 may comprise dedicated memory or may facilitate the memory 216 to store configuration instructions for execution by the embedded processor(s) of the compute complex 214. As such, the FPGA device 200 may also execute an operating system 220 that may be mounted via the compute complex 214 to run various online or offline applications on data stored in the storage drives connected to the FPGA device 200. In this regard, the compute complex 214 may be specifically configured to facilitate one or more software engines for application of functionality to data retrieved from a locally connected storage drive or via the IO module 202.

The FPGA device 200 also includes a DRAM buffer that may be used as a staging buffer of the FPGA device 200 to facilitate ingress or egress of data with respect to the FPGA device 200. In addition, as described in greater detail below, the DRAM buffer may be used in peer-to-peer data movement between storage drives in a storage system as managed by the FPGA device 200 of one or more coordinating storage drives without involving the host (e.g., without involving host memory buffer copies).

The FPGA fabric 212 may be configured to perform a number of different data management functionalities in relation to the data storage in a connected storage drive.

Examples of such data management functionality may generally include interface management, data flow management, and/or data acceleration.

In relation to interface management, the FPGA fabric 212 may be configured (e.g., by a bitstream as described above) to provide a particular interface functionality for communication of data to or from a storage drive associated with the FPGA device 200 (e.g., connected to one of the drive connections 204). As noted above, storage drives are traditionally statically configured to utilize a given type of connector and communication protocol that comprise an interface. For instance, a storage drive may be a SATA, SAS, NAS, PCIe, or other drive type that is visible to the host in connection with the particular interface for the storage drive. Each of these various interfaces may have different characteristics such as bandwidth, command queue depth, duplex characteristic, data transfer speeds, power consumption, etc. In traditional approaches such characteristics must be analyzed and a particular static interface type chosen based on an application to maximize the characteristics required for a given context.

However, in the present disclosure, the FPGA fabric 212 may be dynamically configured during operation of the storage device 200 to support different interfaces for associated storage drives. Thus, the interface for the storage resources of the CSD may be modified during operation of the CSD to leverage advantages of a given interface. Such configuration may be dynamically provided at the FPGA fabric 212. In addition, the FPGA fabric 212 may function to reassign pins of a connector of the IO module 202 and/or drive connections 204 to support the change in interface. Thus, an interface may be dynamically configured by the FPGA fabric 212 such that the communication protocol used to communicate with a storage drive is changed along with the pin assignments for a connector. As such, the storage drive and/or connection to a host or peer storage drive via the 10 module 202 may be dynamically changed without power-cycling the FPGA device 200 and without changing the physical connection between the components of the system.

Figure 3:
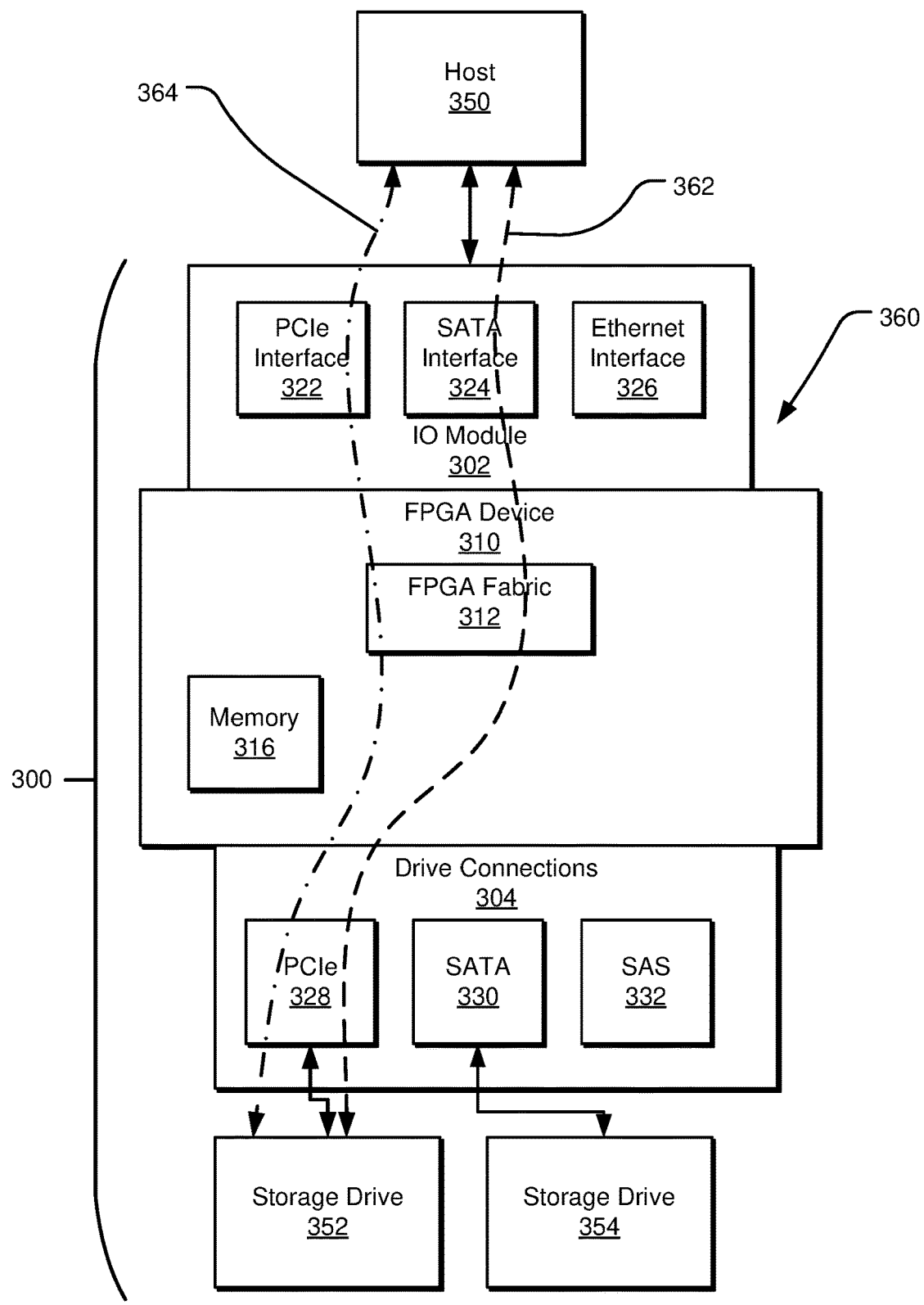
FIG. 3 is a schematic view of an example storage system in which a storage interface is dynamically modified between two time instances.

Thus, for example, a dynamic reconfiguration of the interface for a CSD 300 comprising an FPGA device 360 is depicted in FIG. 3. The foregoing discussion of the FPGA device 200 is equally applicable to the FPGA device 360 shown in FIG. 3, although some components are omitted for clarity. In FIG. 3, the IO module 302 is in operative communication with a host 350. The IO module 302 may be connected to the host 350 via any one or more connector or port of the IO module 302. For instance, the IO module 302 may be connected to the host via an ethernet connection using an RJ45 connector. This may include communication with the host 350 over a network infrastructure such that the host 350 may be remote from the CSD 300. Alternatively, the IO module 302 may use another connector to facilitate communication with the host 350 such as PCIe connector or the like.

Also, the FPGA device 360 may be connected to a storage drive 352 via a PCIe drive. connector 328. The FPGA device 360 may also be connected to a storage drive 354 via a SATA drive connector 330. As may be appreciated, this arrangement is shown for illustration. In other examples, multiple drives may be connected to the FPGA device 360 via the same type of connector or may use others of the available drive connectors 304 without limitation.

FIG. 3 also illustrates a number of data flows for data. In a first instance, the FPGA fabric 312 may be configured (e.g., by a bitstream from a bitstream storage area or other source) to be configured to provide a first communication interface that supports a first data flow 362 represented as a dashed line. In this first instance, the first data flow 362 is provided via a SATA interface utilizing associated SATA communication protocols as configured by the FPGA fabric 312. Data may be read from or written to one or more associated storage drives using the SATA interface to, for example, take advantage of particular characteristics of the SATA interface. Thus, the host 350 may be presented with a SATA interface 324 and the storage drive 352 may be accessed with the SATA interface protocol using the PCIe connector 328 of the drive connectors 304. As may be appreciated, in the data flow 362, the first communication interface presents a different interface to the host 350 as compared to the interface used to communicate with the storage drive 352. In this regard, it may be that the IO module 302 and the drive connections 304 may be configured to use different respective communication protocols to support a data flow 362 traversing the FPGA device 310.

At a second instance, the FPGA fabric 212 may be reconfigured to provide a second communication interface comprising a PCIe interface represented by the second data flow 364 shown as a dash-dot line. As may be appreciated, the second communication interface is different than the first communication interface. The PCIe interface may provide different characteristics than the SATA interface. In this regard, the IO module 302 provides a PCIe interface to the host 350. Data may be provided through the CSD 360 via the PCIe interface with the host and via the PCIe connector to the storage drive 352. As may be appreciated the dynamic reconfiguration of the FPGA fabric 312 allows for reconfiguration of the interface without reconnecting devices and without restarting or power-cycling the FPGA device 360.

The communication interface configuration of the FPGA fabric 312 may be facilitated by a hardware engine executed by the FPGA fabric 312 based on the configuration of the FPGA fabric based on a given bitstream provided to the FPGA fabric 312 for configuration thereof. Importantly, the configuration and/or reconfiguration of the FPGA fabric 312 may be dynamic such that the reconfiguration may be provided at run-time. In this regard, the FPGA fabric 312 may be configured to a particular interface of a plurality of interface options. Such configuration of the FPGA fabric 312 to support a given interface may be selected based on an operation of the drive such that a given interface may be selected that is most appropriate (e.g., has beneficial characteristics for the given operation being conducted). As an example, data ingress (e.g., data to be written to a drive) may be processed by a first interface while data egress (e.g., data to be read from a drive) may be processed by a second, different interface.

In this regard, an interface management module may be executed by the FPGA device 360. The interface management module may comprise a hardware engine executed by the FPGA fabric 312 or may be a software engine executed by the compute complex of an FPGA device. In any regard, the interface management module may be operative to control the configuration of the FPGA fabric 312 using a configuration bitstream retrieved from a bitstream storage area. The interface management module may be operative to dynamically reconfigure the communication interface of the FPGA fabric 312 in response to a command from the host 350 or other remote device. Alternatively, the interface management module may reconfigure the communication interface based on an operation to be performed. For instance, a first communication interface may be automatically selected for configuration of the FPGA fabric 312 based on favorable characteristics of the first communication interface for a first operation (e.g., data ingress). A second communication interface may be automatically selected for configuration of the FPGA fabric 312 based on favorable characteristics of the second communication interface for a second operation (e.g., data acceleration).

Figure 4:
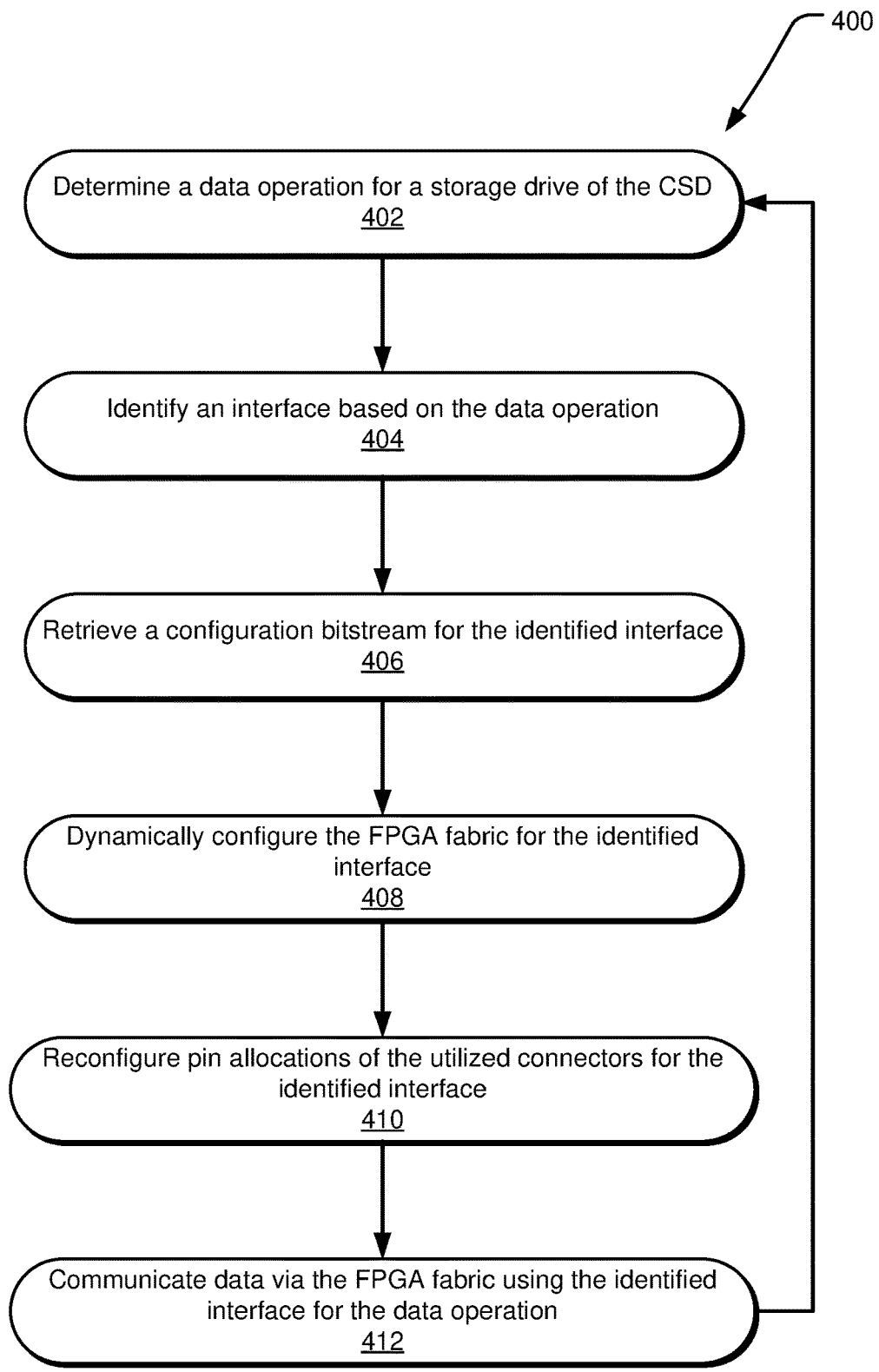
FIG. 4 illustrates example operations for a computational storage devices having a programmable FPGA device.

Example operations 400 for operation of a CSD comprising an FPGA device as described herein are presented in FIG. 4. The example operations 400 may include a determining operation 402 in which a data operation for a memory device of the CSD is determined. As described above, a data operation may be any data operation regarding a memory device of the CSD including, without limitation, a write operation, a read operation, a data flow management operation, a data acceleration operation, or any other appropriate operation to be conducted on data sent to or retrieved from a memory device of the CSD.

The operations 400 also include an identifying operation 404 in which an appropriate communication interface is identified based on the data operation determined in the determining operation 402. For example, the communication interface may be selected based on beneficial characteristics of a given interface for a given data operation. In one example, the identification operation 404 may include automatic selection of a communication interface. This may include a lookup table for various operations to automatically select a given communication interface based on the determined data operation from the determining operation 402. Alternatively, the identifying operation 404 may include receipt of an express command for selection of a given one of the communication interfaces.

In any regard, the operations 400 may include a retrieving operation 406 in which a configuration bitstream may be retrieved from a bitstream storage area. The retrieving operation 406 may include retrieving the configuration bitstream, which may be present locally or remote from the FPGA device, based on the identified interface from the identifying operation 404. In turn, a configuring operation 408 may be performed to dynamically configure the FPGA fabric for the identified communication interface for which a configuration bitstream is retrieved. As noted above, this configuring operation 408 be performed at runtime without power cycling of the FPGA device using the configuration bitstream for the identified communication protocol.

The operations 400 may also include a reconfiguration operation 410 in which pin allocations of physical connectors utilized between the I/O module and/or drive connectors of an FPGA device may be reconfigured such that the hardware pins utilized to connect the various devices may be reallocated based on the protocol of the interface chosen. Thus, for example, rather than providing separate dedicated pins for each respective communication interface, a given physical connector may be utilized such that the pins of the physical connector are reconfigured based on which communication interface is configured. This may allow physical connectors to support a plurality of communication interfaces utilizing different protocols without having to disconnect and reconnect physical connections to the IO module and/or drive connector. The operations may include a communication operation 412 in which the data is communicated via the FPGA fabric using the identified interface for data operation. The communication operation 412 relates to the transfer of data to or from the memory devices using the communication interface, however, other data operations may also be performed simultaneously on such data. In any regard, the data transfer via the FPGA device may be according to the dynamically configured communication interface.

The operations 400 may be iterative such that the operations 400 may return to the determining operation 402 upon receipt of a subsequent data operation. In this regard, the CSD may be continually dynamically reconfigured based on the nature of the data operations received at the CSD. Reconfiguration may be performed for each individual operation or may require receipt of a threshold number of successive operations to be received prior reconfiguration of the FPGA device. For example, a single write operation followed a single read operation may not trigger reconfiguration. However, in certain contexts, repetitive data operations may occur such as in a bulk import of data, a bulk export of data, receiving data from a sensor, performing data acceleration, or other specific contexts in which the CSD may be utilized. In this regard, data operations may be received such that the device may be configured after a threshold number of the same type of data operations is exceeded or in response to an indication that a given task comprising a large number of the same types of data operations may be performed by the CSD such that the benefits of a given communication interface may be beneficial.

With returned reference to FIG. 2, the FPGA fabric 212 may also be dynamically configured to perform one or more particular data flow management functionalities with respect to data in addition to or alternatively to the data interface management described above. The data flow management may be performed by the FPGA fabric 212 on data received by the FPGA fabric 212 prior to storage on an associated (e.g., connected) storage drive via a drive connections 204 or may be retrieved from a connected storage drive for application of the data management functionality to the data. The data flow management functionality may include in-line encryption of data by the FPGA fabric 212. Additionally or alternatively, the data flow management functionality may provide for data compression of data by the FPGA fabric 212. Further still, the data flow management functionality may provide data provenance information including hashing or signature matching by the FPGA fabric 212. Such data flow management may be provided by one or more hardware engines facilitated by the configured FPGA fabric for execution in relation to data to be stored on an associated storage drive or from data retrieved from a locally associated storage drive. Such data flow management may be provided regardless of the particular communication interface utilized to comminate data to or from a storage drive using the FPGA device 200.

A data acceleration management functionality of the FPGA fabric 212 may also be configured by providing a specific bitstream for configuration of the FPGA fabric 212. As an example, a data acceleration function may include application of artificial intelligence or machine learning analytics that may include execution of an artificial intelligence (AI) acceleration engine by the FPGA fabric 212. In this regard, the AI acceleration engine may be executed by the configured FPGA fabric 212 to provide some artificial intelligence or machine learning functionality in relation to data to be stored in a connected storage drive, that is retrieved locally from a connected storage drive, or received from a peer storage drive (e.g., without host intervention). In one example, the FPGA fabric 212 may be programmed to perform the acceleration engine as one or more hardware engines. Such data acceleration management function may be provided regardless of the particular communication interface utilized to comminate data to or from a storage drive using the FPGA device 200.

The AI acceleration engine of the FPGA device 200 may provide an application programming interface (API) that may be callable by a host. In this regard, rather than the host calling for retrieval of data from the storage drive for execution of acceleration functionality on the data and returning transformed or new data resulting from the acceleration engine to the storage drive for storage, the API of the FPGA device 200 may be called by the host such that the resulting data provided after execution of the acceleration engine on data stored locally at the storage drive may be returned by the FPGA device 200 in response to the API call by the host. In this regard, the computational functionality associated with the acceleration engine (e.g., application of the AI functionality to the locally stored data) may be applied locally by the FPGA fabric 212 such that only the resulting data resulting from the acceleration engine application to the data is returned to the host.

Accordingly, it may be appreciated that the FPGA fabric 212 may be specifically configured as one or more hardware engines to perform one or more of the functionalities noted above including interface management, data flow management, or acceleration management. However, other configurable functionality may be provided by an FPGA fabric 212 without limitation such that other computational functionality associated with data accessible by the FPGA device 200 may be provided without limitation.

Figure 5:
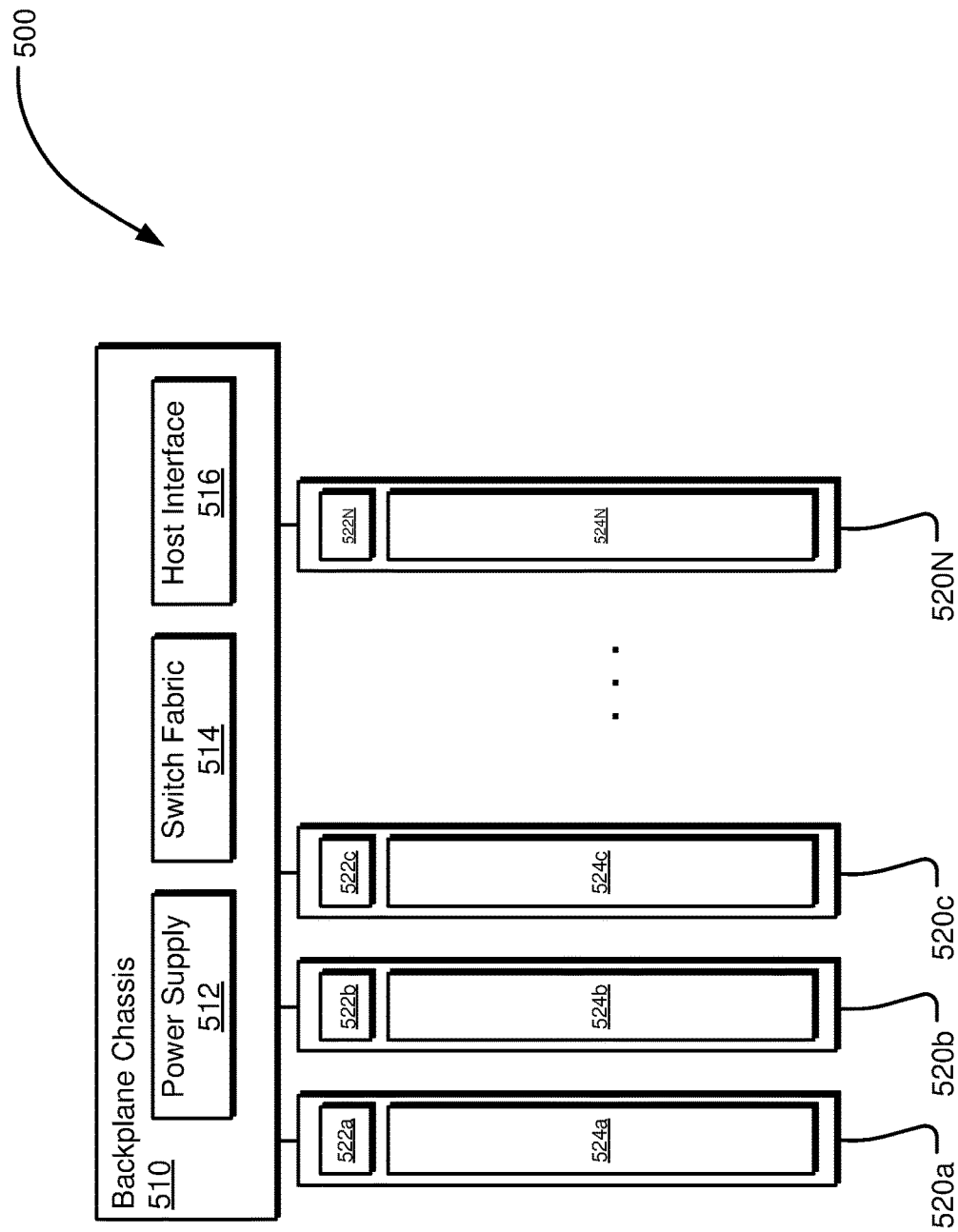
FIG. 5 is a schematic view of an example of a rack-based storage system having computational storage devices having a programmable FPGA device.

As noted above, an FPGA device 200 may be incorporated into a rack-mounted CSD or as a CSD of a storage appliance. FIG. 5 depicts an example of CSDs 520 according to the present disclosure deployed in a rack-based storage system platform 500. The storage system platform 500 includes a backplane chassis 510. A plurality of CSDs 520a, 520b, 520c, . . . , 520N may be provided in operative communication with the backplane chassis 510. The backplane chassis 510 may include shared resources for the storage system platform 500 including, for example, a power supply 512, switch fabric 514, and/or a host interface 516. Other devices or modules may be provided at the backplane chassis 510 without limitation. In addition, the plurality of CSDs 520a-520N may be provided via corresponding connectors 526a-526N. The connectors 526 may be standardized connector interfaces to provide operative communication between corresponding CSDs 520 and the backplane chassis 510.

Figure 6:
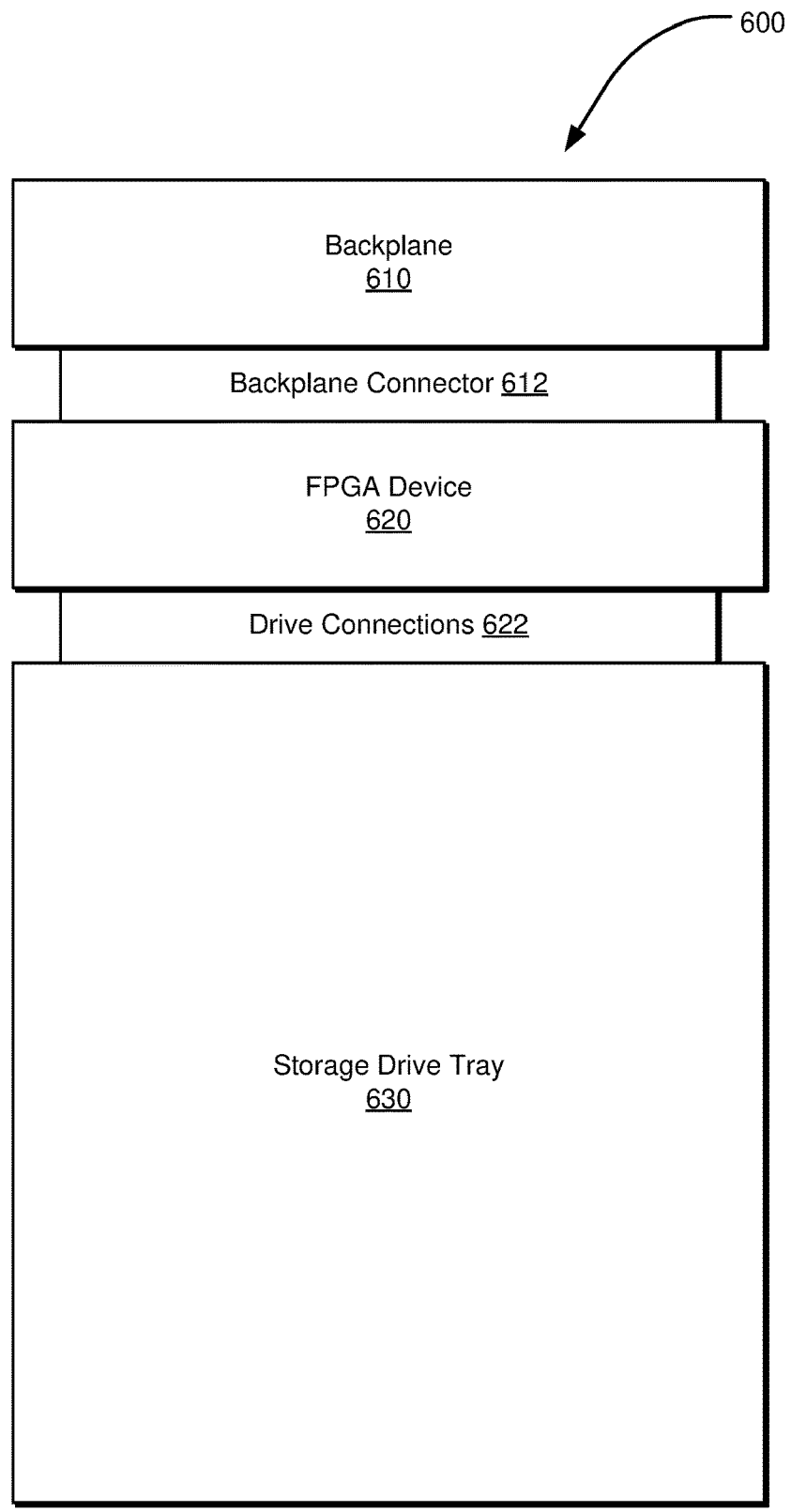
FIG. 6 is a schematic view of a storage system including an FPGA device for use in a rack-based storage system.

Continuing the rack-based example of FIG. 5, a CSD 520 is depicted in more detail in FIG. 6 that may be specifically adapted to provide an integrated CSD device having an FPGA device 620 and memory devices integrated into a common enclosure or chassis such that the CSD 520 may be utilized in a standard rack-based storage system. The CSD 520 may have a backplane connector 612 for engagement with a standardized or proprietary backplane 610 of a server rack. The backplane connector 612 may incorporate any of the foregoing discussion of the 10 module described in other examples. The CSD 520 may also include an FPGA device 620 according to any of the discussion provided herein.

The FPGA device 600 may include one or more drive connections 622. The drive connections 622 maybe arranged relative to a storage drive tray 630 for supportive engagement of one or more memory devices or drives. The storage drive tray 630 and drive connections 622 may be configured to support simultaneous connectivity to a plurality of standardized storage drives or other memory devices. For example, the storage drive tray 630 may include an upper surface and a lower surface. The upper surface may provide support to a first storage drive that may be connected to the FPGA device 620 via a first drive connection 622. The lower surface may provide support to a second storage drive that may be connected to the FPGA device 620 via a second drive connection 622. The drive connections 622 and drive tray 630 may simultaneously support a plurality of the same type of drive or different types of drive configurations.

As described above, the FPGA device 620 may be configured to present to a host the plurality of storage drives connected to the FPGA device 620 as a single storage resource or a plurality of storage resources. This may allow for provisioning or tiering of the storage resources provided by the storage drives connected to the FPGA device 620. In an alternative embodiment, the FPGA device 620 may be provided as an integrated unit with one or more storage drives. In this regard, rather than having drive connections 622 that provide swappable or interchangeable engagement between an FPGA device 620 and a storage drive, the storage drive may be fixedly provided with an FPGA device 600. In this case, the FPGA device 600 may be provided with one or more storage drives in a common enclosed chassis.

In any regard, the FPGA device 600 and/or connected or integrated storage drives may have a form factor that is similar to or the same as a standard rack-mounted storage drive. This may be true even when the FPGA device 600 is operatively engaged with a plurality of storage drives. As such, the FPGA device 600 and storage drives connected thereto may be deployed into a standardized rack slot for engagement with a backplane chassis of a storage system. In this regard, the FPGA device 600 may be used to provide configurable computational functionality to a storage drive in a form factor that facilitates engagement of the FPGA device 600 and associated storage drives in a standardized rack space of a storage system.

Figure 7:
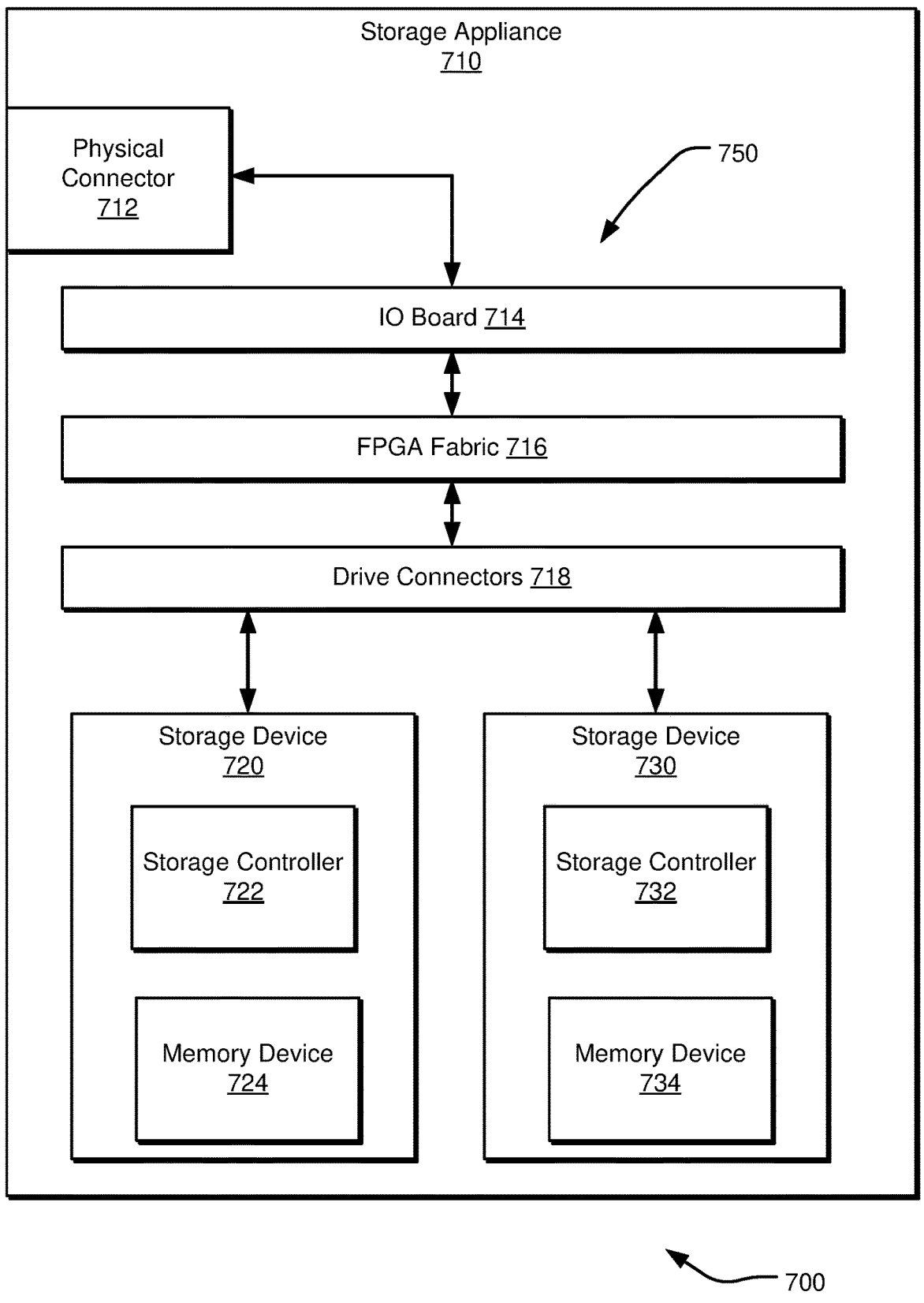
FIG. 7 is a schematic view of an example of a storage appliance having computational storage devices having a programmable FPGA device.

In contrast to the rack-based form factor described in relation to FIGS. 5 and 6, FIG. 7 depicts another example of a CSD 700 that is provided as a storage appliance 710. Storage appliance 710 may generally include an FPGA device 750 that includes an I/O module 714, FPGA fabric 716, and drive connectors 718 is generally described above. The I/O module 714 may be connected to a physical connector 712 that may allow for physical connections to be made to the storage appliance 710. The physical connector 712 may include a number of different types of connectors to support a variety of different interfaces such as those described above. In addition, the drive connectors 718 may be in operative communication with the plurality of storage devices 720 and 730. Storage device 720 may include a storage controller 722 and a memory device 724. Storage device 730 may include a storage controller 732 and a memory device 734. In this regard, the FPGA device 750 may be utilized to perform any of the foregoing functionality including data interface reconfiguration for operations to be performed relative to the storage device 720 and/or seven storage device 730. As may be appreciated, the storage appliance 710 may include the physical connectors 712, the FPGA device 750, storage device 720, and storage device 730 in an enclosure such that the storage appliance 710 may be deployed at a given location to provide a CSD with inbuilt functionality and data storage. That is, the storage appliance 710 may be deployed outside a rack-based infrastructure of a datacenter or the like. For example, the storage appliance 710 may be deployed an edge of a network to provide storage capacity and data management functionality according to the disclosure provided above.

Figure 8:
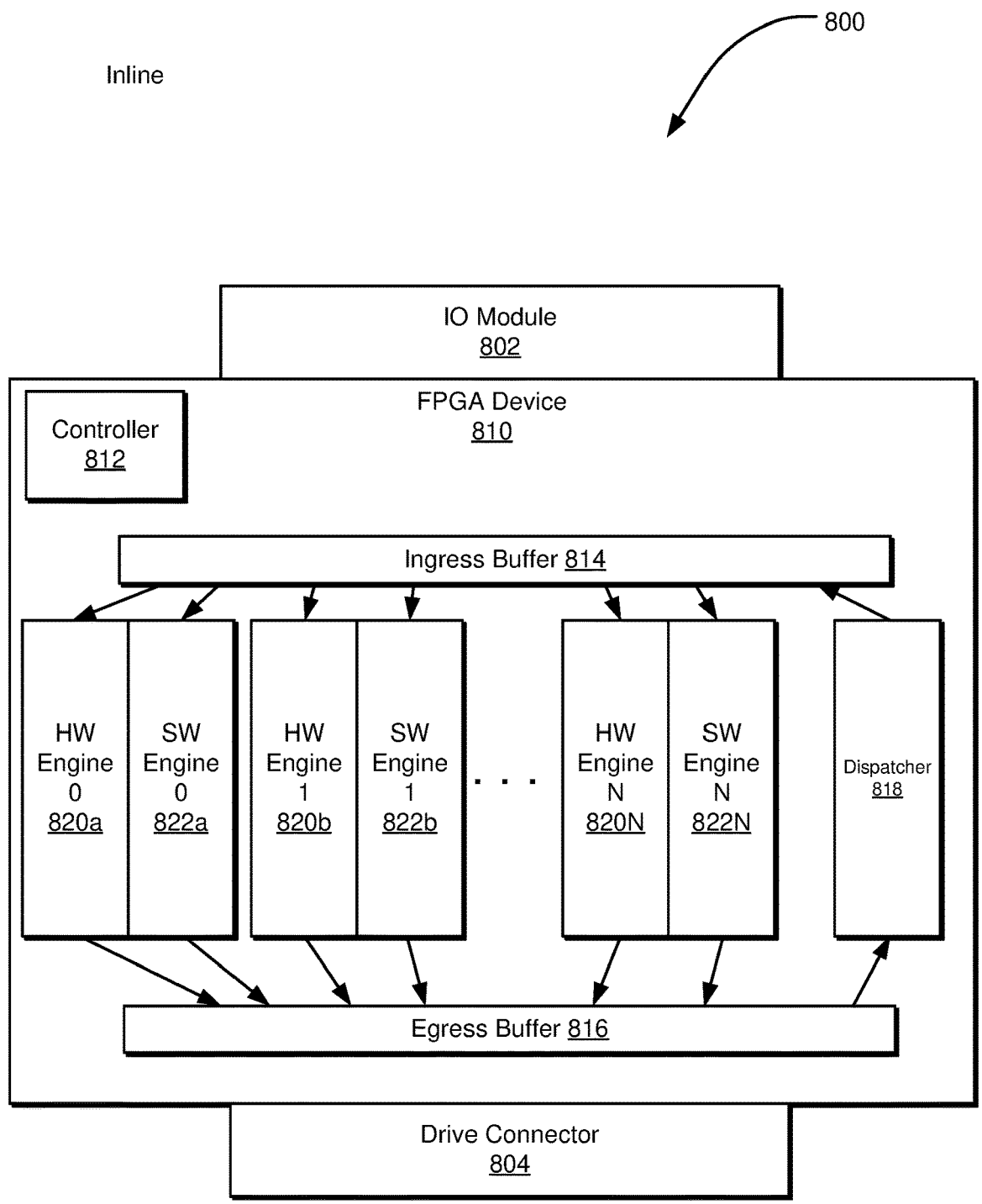
FIG. 8 is a schematic view of an example of an FPGA device operating in an in-line configuration.
Figure 9:
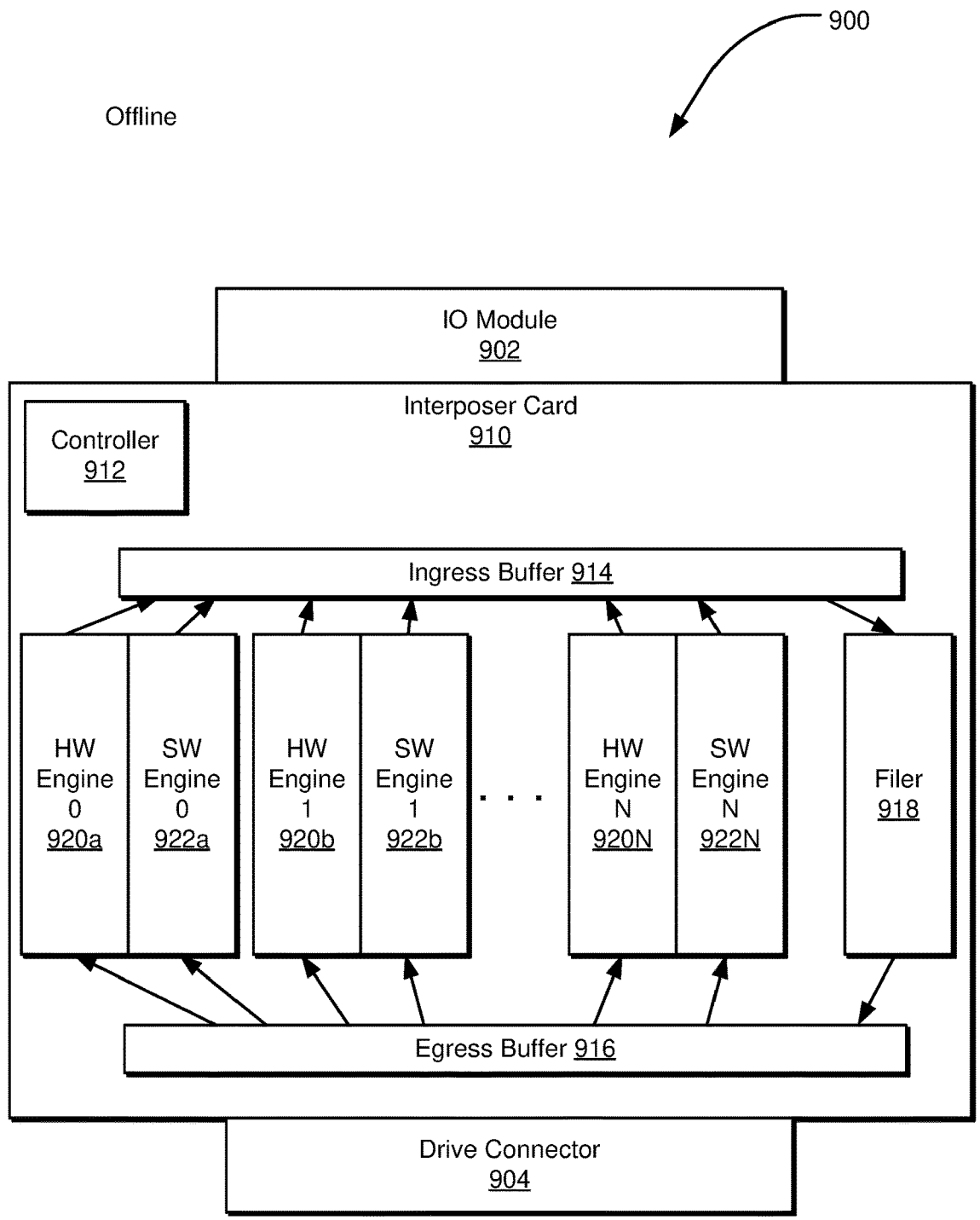
FIG. 9 is a schematic view of an example of an FPGA device operating in an off-line configuration.

FIGS. 8 and 9 generally depict two potential contexts for utilization of an FPGA device by providing either in-line functionality as described in FIG. 8 or providing off-line functionality as shown in FIG. 9

In FIG. 8, an FPGA device 810 is shown that includes an 10 module 802 and drive connectors 804 according to any of the foregoing description. In addition, the FPGA device 810 includes a controller module 812 which may include one or more processors and/or memory that may be used for control functionality of the FPGA device 800 including, for example, issuing bit streams for configuration of the FPGA complex and/or compute complex of the FPGA device 810.

In the depicted example of FIG. 8, a plurality of hardware engines 820 and software engines 822 may be correspondingly paired to act on data traversing the FPGA device 800. Specifically, hardware engine 0 820*a*, hardware engine 1, 820*b*, ..., hardware engine N 820N may be provided in corresponding pairs with software engine 0 822*a*, software engine 1 822*b*, ..., software engine N 822N. Each respective hardware engine may correspond to a hardware engine executed by an FPGA fabric of the FPGA device 800. Each respective software engine 822 may correspond to a software engine be executed by a compute complex of the FPGA device 800. Each corresponding hardware engine 820 and software engine 822 pair may provide functionality applied to data received from an ingress buffer 814 provided by a DRAM buffer as described in relation to FIG. 2. In this regard, as data flows from the IO module 802 to the ingress buffer 814, the ingress buffer 814 may direct data to respective ones of the hardware engines 820 or software engines 822 for application of the respective functionality provided by the corresponding hardware or software engine. In turn, the hardware engine 820 or software engine 822 processing the data may provide process data to egress buffer 816, which may coordinate writing the data to an associated storage drive via the drive connector 804. As may be appreciated, each of the hardware engines 820 and software engines 822 may provide one or more corresponding functionalities such as interface management, data flow management, and/or data acceleration management as described in any of the foregoing examples. As such, various ones of the hardware engines 820 may execute the same functionality or different hardware engines 820 may provide different corresponding functionalities chosen from those described above or others. In this regard, the example shown in FIG. 8 may be referred to as an in-line operation as data that is being provided for writing to the storage drives associated with the FPGA device 800 is the data upon which the functionality from the hardware engines 820 and software engines 822 may be applied. Optionally, the FPGA device 800 may include a dispatcher 818 that may receive data from the egress buffer 816 and provide the data to the ingress buffer 814. That is, dispatcher 818 may provide resulting data to a host, or cloud environment in response to the data being stored and/or processed by the FPGA device 800.

Alternatively, with reference to FIG. 9, an FPGA device 900 may be provided for off-line operation. In this regard, the FPGA device 900 includes similar components is that described with respect to FIG. 8 including an 10 module 902, an ingress buffer 914, hardware engines 920, software engines 922, and egress buffer 916, a drive connector 904, and a controller 912. However, in contrast to the FPGA device 800 shown in FIG. 8 in which functionality may be applied to data received at the FPGA device 800 for storage in an associated storage drive, the FPGA device 900 may receive data stored locally at an associated storage drive from the egress buffer 916 such that functionality from the one or more hardware engine 920 or software engines 922 are applied to data that has been stored locally at an associated drive the FPGA device 900. This may be in response to an instruction from a host device requesting certain functionality be applied to locally stored data (e.g., through APIs described above) or may be locally coordinated by the controller 912. In any regard, resulting data generated by the application of the one or more hardware engines 920 or software engine 922 may be provided to a host device or cloud environment via the ingress buffer 914. That is, the FPGA device 900 may perform an off-line compute on locally stored data of associated storage drives with resulting data being provided from the FPGA device 900 to a host or cloud environment. In addition, a filer 918 may be provided for simultaneously storing incoming data received at the ingress buffer 914 and provided to the egress buffer 916 providing to an associated storage drive by the FPGA device 900.

In relation such off-line operations, it may be appreciated that an FPGA device according to the present disclosure may provide sufficient computational capacity to allow for coordinated operation across a plurality of storage drives and/or peer FPGA devices provided with such storage drives. Such coordinated functionality may include peer-to-peer execution of any one or more of the foregoing functionalities including interface management, data flow management, or data acceleration management.

Figure 10:
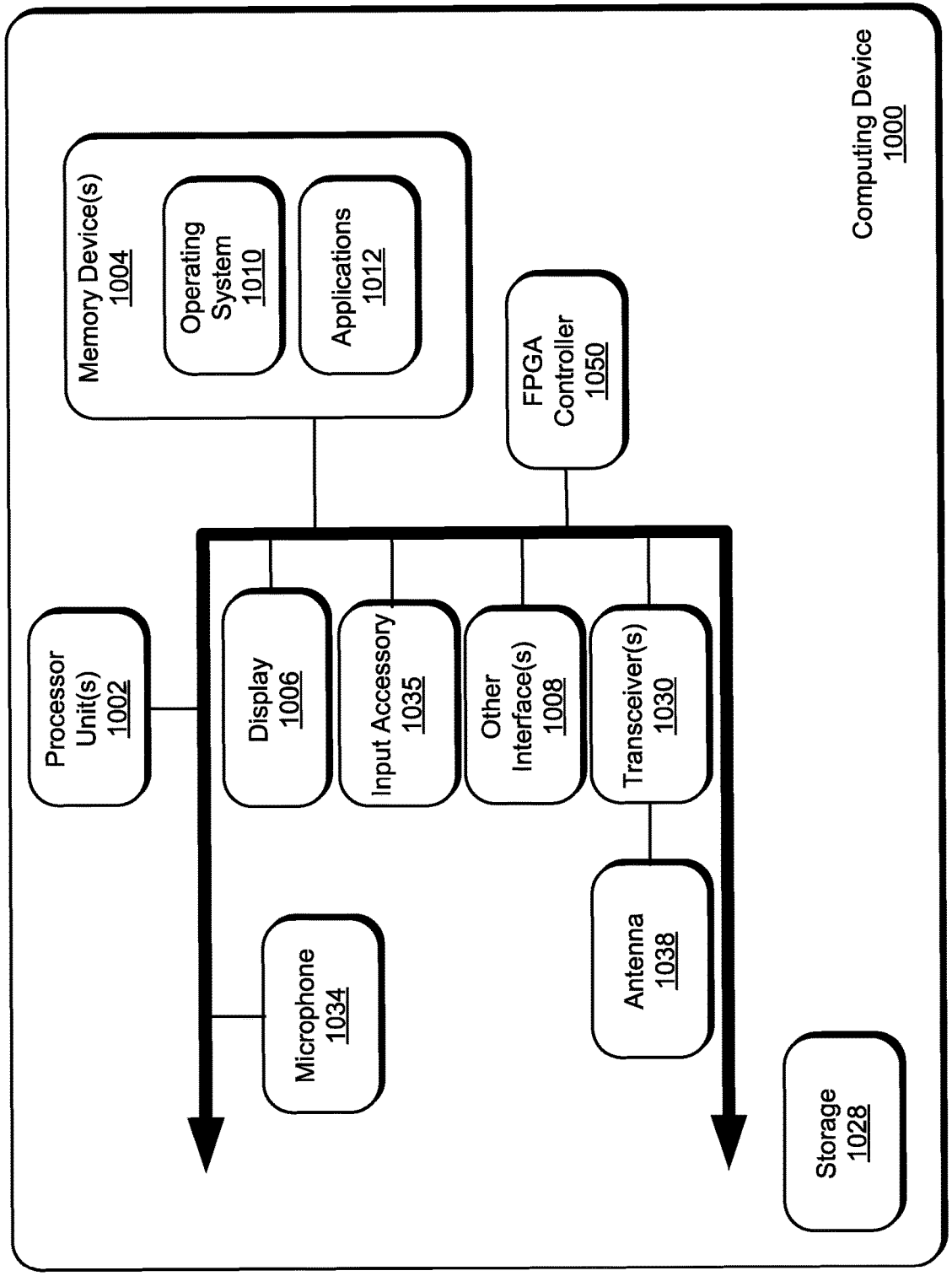
FIG. 10 is a schematic view of an example of a computing device that may be used to execute aspects of the present disclosure.

FIG. 10 illustrates an example schematic of a computing device 1000 suitable for implementing aspects of the disclosed technology including an FPGA controller 1050 for control of an FPGA device as described above. The computing device 1000 includes one or more processor unit(s) 1002, memory 1004, a display 1006, and other interfaces 1008 (e.g., buttons). The memory 1004 generally includes both volatile memory (e.g., RAM) and non-volatile memory (e.g., flash memory). An operating system 1010, such as the Microsoft Windows® operating system, the Apple macOS operating system, or the Linux operating system, resides in the memory 1004 and is executed by the processor unit(s) 1002, although it should be understood that other operating systems may be employed.

One or more applications 1012 are loaded in the memory 1004 and executed on the operating system 1010 by the processor unit(s) 1002. Applications 1012 may receive input from various input local devices such as a microphone 1034, input accessory 1035 (e.g., keypad, mouse, stylus, touchpad, joystick, instrument mounted input, or the like). Additionally, the applications 1012 may receive input from one or more remote devices such as remotely-located smart devices by communicating with such devices over a wired or wireless network using more communication transceivers 1030 and an antenna 1038 to provide network connectivity (e.g., a mobile phone network, Wi-Fi®, Bluetooth®). The computing device 1000 may also include various other components, such as a positioning system (e.g., a global positioning satellite transceiver), one or more accelerometers, one or more cameras, an audio interface (e.g., the microphone 1034, an audio amplifier and speaker and/or audio jack), and storage devices 1028. Other configurations may also be employed.

The computing device 1000 further includes a power supply 1016, which is powered by one or more batteries or other power sources and which provides power to other components of the computing device 1000. The power supply 1016 may also be connected to an external power source (not shown) that overrides or recharges the built-in batteries or other power sources.

In an example implementation, the computing device 1000 comprises hardware and/or software embodied by instructions stored in the memory 1004 and/or the storage devices 1028 and processed by the processor unit(s) 1002. The memory 1004 may be the memory of a host device or of an accessory that couples to the host. Additionally or alternatively, the computing device 1000 may comprise one or more field programmable gate arrays (FPGAs), application specific integrated circuits (ASIC), or other hardware/software/firmware capable of providing the functionality described herein.

The computing device 1000 may include a variety of tangible processor-readable storage media and intangible processor-readable communication signals. Tangible processor-readable storage can be embodied by any available media that can be accessed by the computing device 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 1000. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

One general aspect of the present disclosure includes a storage device that includes an FPGA device with a programmable FPGA fabric. The storage device also includes one or more memory devices in operative communication with the FPGA device. The one or more memory devices are operative for non-volatile storage of data therein. The storage device further includes a storage resource that stores a plurality of FPGA configuration bitstreams for dynamic reconfiguration of the FPGA fabric during operation of the storage drive between at least a first communication interface for communication of data with the one or more memory devices and a second communication interface for communication of data with the one or more memory devices. The storage device includes an interface management module of the FPGA device that is operative to access the storage resource to retrieve a selected FPGA configuration bitstream from the plurality of FPGA configuration bitstreams. The interface management module also is operative to dynamically reconfigure the FPGA fabric between at least the first communication interface and the second communication interface during operation of the storage device using the selected FPGA configuration bitstream. The storage device includes a physical hardware connector to establish operative communication between the FPGA device and another device. The physical hardware port is utilized for both the first communication interface and the second communication interface to facilitate communication of data between the another device and the one or more memory devices.

Implementations may include one or more of the following features. For example, the one or more memory devices comprise the storage resource including the plurality of FPGA configuration bitstreams.

In an example, pins of the physical hardware connector may be reassigned from the first communication interface to the second communications interface.

In an example, the interface management module of the FPGA device is operative to reconfigure the FPGA fabric during operation of the storage drive to a selected one of the first communications interface or the second communication interface based on a data operation performed in relation to the one or more memory devices. The first communication interface may utilize a first communication protocol and the second communication interface may utilize a second communication protocol.

In an example, one or more memory device connectors may be provided for establishing operative communication between the FPGA device and the one or more memory devices. The one or more memory device connectors may be reconfigured by the FPGA fabric to support the first communication interface and the second communication interface. The interface management module may dynamically reconfigure the FPGA fabric without power cycling the storage device.

In an example, the storage device may also include an interface comprising a secure channel to receive a new version of a specific FPGA configuration bitstream in response to authentication of a signature of the new version of a specific FPGA configuration bitstream.

In an example, at least one of the first communication interface or the second communication interface may include a first communication protocol for the physical hardware port different than a second communication protocol used by the FPGA device to communicate with the another device.

Another general aspect of the present disclosure includes a method for operation of a computational storage drive. The method includes determining a data operation to be performed relative to data of one or more memory devices in operative communication with an FPGA device comprising a programmable FPGA fabric. The method also includes identifying an identified one of a plurality of FPGA configuration bitstreams based on the data operation. Respective ones of the plurality of FPGA configuration bitstreams dynamic configure the FPGA fabric during operation of the computational storage drive between at least a first communication interface for communication of data with the one or more memory devices and a second communication interface for communication of data with the one or more memory devices. The method also includes dynamically reconfiguring the FPGA fabric to a corresponding one of the first communication interface or the second communication interface using the identified one of the plurality of FPGA configuration bitstreams and performing the data operation on the data of the one or more memory devices using the corresponding one of the first communication interface or the second communication interface.

Implementations may include one or more of the following features. For example, the identifying the identified one of the plurality of FPGA configuration bitstreams may include retrieving the identified one of a plurality of FPGA configuration bitstreams from a storage resource that stores the plurality of FPGA configuration bitstreams.

In an example, the dynamically reconfiguring may include reassigning pins of a physical hardware connector establishing operative communication between the FPGA device and another device for a communication protocol of the corresponding one of the first communication interface or the second communication interface. The dynamically reconfiguring may be performed during operation of the computational storage drive based on the data operation performed in relation to the one or more memory devices. Furthermore, the first communication interface may use a first communication protocol and the second communication interface may use a second communication protocol.

In an example, the method may include reconfiguring one or more memory device connectors for establishing operative communication between the FPGA device and the one or more memory devices based on the corresponding one of the first communication interface or the second communication interface. The dynamically reconfiguring may occur without power-cycling the computational storage device.

In an example, the method further includes receiving a new version of a specific FPGA configuration bitstream over a secure channel in response to authentication of a signature of the new version of a specific FPGA configuration bitstream.

In an example, at least one of the first communication interface or the second communication interface may include a first communication protocol for the physical hardware port different than a second communication protocol used by the FPGA device to communicate with the another device.

Another general aspect of the present disclosure includes one or more tangible processor-readable storage media embodied with instructions for executing on one or more processors and circuits of a device a process for operation of a computational storage device. The process includes determining a data operation to be performed relative to data of one or more memory devices in operative communication with an FPGA device comprising a programmable FPGA fabric. The process also includes identifying an identified one of a plurality of FPGA configuration bitstreams based on the data operation. Respective ones of the plurality of FPGA configuration bitstreams dynamic configure the FPGA fabric during operation of the computational storage drive between at least a first communication interface for communication of data with the one or more memory devices and a second communication interface for communication of data with the one or more memory devices. The process also includes dynamically reconfiguring the FPGA fabric to a corresponding one of the first communication interface or the second communication interface using the identified one of the plurality of FPGA configuration bitstreams and performing the data operation on the data of the one or more memory devices using the corresponding one of the first communication interface or the second communication interface.

Implementations may include one or more of the following features. For example, the identifying the identified one of the plurality of FPGA configuration bitstreams may include retrieving the identified one of a plurality of FPGA configuration bitstreams from a storage resource that stores the plurality of FPGA configuration bitstreams.

In an example, the dynamically reconfiguring may include reassigning pins of a physical hardware connector establishing operative communication between the FPGA device and another device for a communication protocol of the corresponding one of the first communication interface or the second communication interface.

In an example, the dynamically reconfiguring may be performed during operation of the computational storage drive based on the data operation performed in relation to the one or more memory devices. The first communication interface may use a first communication protocol and the second communication interface may use a second communication protocol.

In an example, the process may further include reconfiguring one or more memory vice connectors for establishing operative communication between the FPGA device and the one or more memory devices based on the corresponding one of the first communication interface or the second communication interface.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A storage device, comprising:
a field programmable gate array (FPGA) device comprising a programmable FPGA fabric;
one or more memory devices in operative communication with the FPGA device, wherein the one or more memory devices are operative for non-volatile storage of data therein;
a storage resource that stores a plurality of FPGA configuration bitstreams for dynamic reconfiguration of the FPGA fabric during operation of the storage drive between at least a first communication interface for communication of data with the one or more memory devices and a second communication interface for communication of data with the one or more memory devices;
an interface management module of the FPGA device operative to access the storage resource to retrieve a selected FPGA configuration bitstream from the plurality of FPGA configuration bitstreams and dynamically reconfigure the FPGA fabric between at least the first communication interface and the second communication interface during operation of the storage device using the selected FPGA configuration bitstream; and
a physical hardware connector to establish operative communication between the FPGA device and another device, wherein the physical hardware port is utilized for both the first communication interface and the second communication interface to facilitate communication of data between the another device and the one or more memory devices.

2. The storage device of claim 1, wherein the one or more memory devices comprise the storage resource.

3. The storage device of claim 1, wherein pins of the physical hardware connector are reassigned from the first communication interface to the second communications interface.

4. The storage device of claim 1, wherein the interface management module of the FPGA device is operative to reconfigure the FPGA fabric during operation of the storage drive to a selected one of the first communications interface or the second communication interface based on a data operation performed in relation to the one or more memory devices.

5. The storage device of claim 1, wherein the first communication interface utilizes a first communication protocol and the second communication interface utilizes a second communication protocol.

6. The storage device of claim 1, further comprising:
one or more memory device connectors for establishing operative communication between the FPGA device and the one or more memory devices, wherein the one or more memory device connectors are reconfigured by the FPGA fabric to support the first communication interface and the second communication interface.

7. The storage device of claim 1, wherein the interface management module dynamically reconfigures the FPGA fabric without power cycling the storage device.

8. The storage device of claim 1, further comprising:
an interface comprising a secure channel to receive a new version of a specific FPGA configuration bitstream in response to authentication of a signature of the new version of a specific FPGA configuration bitstream.

9. The storage device of claim 1, wherein at least one of the first communication interface or the second communication interface comprises a first communication protocol for the physical hardware port different than a second communication protocol used by the FPGA device to communicate with the another device.

10. A method for operation of a computational storage drive, the method comprising:
determining a data operation to be performed relative to data of one or more memory devices in operative communication with a field programmable gate array (FPGA) device comprising a programmable FPGA fabric;
identifying an identified one of a plurality of FPGA configuration bitstreams based on the data operation, wherein respective ones of the plurality of FPGA configuration bitstreams dynamic configure the FPGA fabric during operation of the computational storage drive between at least a first communication interface for communication of data with the one or more memory devices and a second communication interface for communication of data with the one or more memory devices;
dynamically reconfiguring the FPGA fabric to a corresponding one of the first communication interface or the second communication interface using the identified one of the plurality of FPGA configuration bitstreams; and
performing the data operation on the data of the one or more memory devices using the corresponding one of the first communication interface or the second communication interface.

11. The method of claim 10, wherein the identifying the identified one of the plurality of FPGA configuration bitstreams comprises retrieving the identified one of a plurality of FPGA configuration bitstreams from a storage resource that stores the plurality of FPGA configuration bitstreams.

12. The method of claim 10, wherein the dynamically reconfiguring comprises reassigning pins of a physical hardware connector establishing operative communication between the FPGA device and another device for a communication protocol of the corresponding one of the first communication interface or the second communication interface.

13. The method of claim 10, wherein the dynamically reconfiguring is performed during operation of the computational storage drive based on the data operation performed in relation to the one or more memory devices.

14. The method of claim 10, wherein the first communication interface utilizes a first communication protocol and the second communication interface utilizes a second communication protocol.

15. The method of claim 10, further comprising:
reconfiguring one or more memory device connectors for establishing operative communication between the FPGA device and the one or more memory devices based on the corresponding one of the first communication interface or the second communication interface.

16. The method of claim 10, wherein the dynamically reconfiguring occurs without power-cycling the computational storage device.

17. The method of claim 10, further comprising:
receiving a new version of a specific FPGA configuration bitstream over a secure channel in response to authentication of a signature of the new version of a specific FPGA configuration bitstream.

18. The method of claim 10, wherein at least one of the first communication interface or the second communication interface comprises a first communication protocol for the physical hardware port different than a second communication protocol used by the FPGA device to communicate with the another device.

19. One or more tangible processor-readable storage media embodied with instructions for executing on one or more processors and circuits of a device a process for operation of a computational storage device, comprising:
determining a data operation to be performed relative to data of one or more memory devices in operative communication with a field programmable gate array (FPGA) device comprising a programmable FPGA fabric;
identifying an identified one of a plurality of FPGA configuration bitstreams based on the data operation, wherein respective ones of the plurality of FPGA configuration bitstreams dynamic configure the FPGA fabric during operation of the computational storage drive between at least a first communication interface for communication of data with the one or more memory devices and a second communication interface for communication of data with the one or more memory devices;
dynamically reconfiguring the FPGA fabric to a corresponding one of the first communication interface or the second communication interface using the identified one of the plurality of FPGA configuration bitstreams; and
performing the data operation on the data of the one or more memory devices using the corresponding one of the first communication interface or the second communication interface.

20. The one or more tangible processor-readable storage media of claim 19, wherein the identifying the identified one of the plurality of FPGA configuration bitstreams comprises retrieving the identified one of a plurality of FPGA configuration bitstreams from a storage resource that stores the plurality of FPGA configuration bitstreams.

21. The one or more tangible processor-readable storage media of claim 19, wherein the dynamically reconfiguring comprises reassigning pins of a physical hardware connector establishing operative communication between the FPGA device and another device for a communication protocol of the corresponding one of the first communication interface or the second communication interface.

22. The one or more tangible processor-readable storage media of claim 19, wherein the dynamically reconfiguring is performed during operation of the computational storage drive based on the data operation performed in relation to the one or more memory devices.

23. The one or more tangible processor-readable storage media of claim 19, wherein the first communication interface utilizes a first communication protocol and the second communication interface utilizes a second communication protocol.

24. The one or more tangible processor-readable storage media of claim 19, further comprising reconfiguring one or more memory vice connectors for establishing operative communication between the FPGA device and the one or more memory devices based on the corresponding one of the first communication interface or the second communication interface.

* * * * *